(12) United States Patent
Terabe et al.

(10) Patent No.: US 7,255,336 B2
(45) Date of Patent: Aug. 14, 2007

(54) WORKPIECE CLAMP DEVICE AND METHOD

(75) Inventors: Masahito Terabe, Saitama (JP); Daiji Sukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/465,638

(22) Filed: Aug. 18, 2006

(65) Prior Publication Data
US 2007/0040315 A1    Feb. 22, 2007

(30) Foreign Application Priority Data
Aug. 18, 2005    (JP)    ............................. 2005-237125

(51) Int. Cl.
*B25B 1/00*    (2006.01)
(52) U.S. Cl. ............................... 269/152; 269/289 MR

(58) Field of Classification Search ................ 269/152, 269/289 MR; 29/281.1
See application file for complete search history.

(56) References Cited

U.S. PATENT DOCUMENTS

| | | | |
|---|---|---|---|
| 3,595,559 A | | 7/1971 | Gettinger |
| 3,671,032 A | | 6/1972 | Gettinger |
| 5,471,796 A | * | 12/1995 | Thompson ................... 451/296 |
| 5,934,626 A | * | 8/1999 | Collins, Jr. .................. 248/132 |
| 6,179,024 B1 | * | 1/2001 | Yang ........................... 144/287 |

FOREIGN PATENT DOCUMENTS

| | | |
|---|---|---|
| GB | 702856 | 1/1954 |
| JP | 07-276362 | 10/1995 |

* cited by examiner

*Primary Examiner*—Lee D Wilson
(74) *Attorney, Agent, or Firm*—Standley Law Group LLP

(57) ABSTRACT

A workpiece clamp device comprising a workpiece cradle for placing a workpiece, and endless belts for holding the workpiece down on the workpiece cradle.

5 Claims, 7 Drawing Sheets

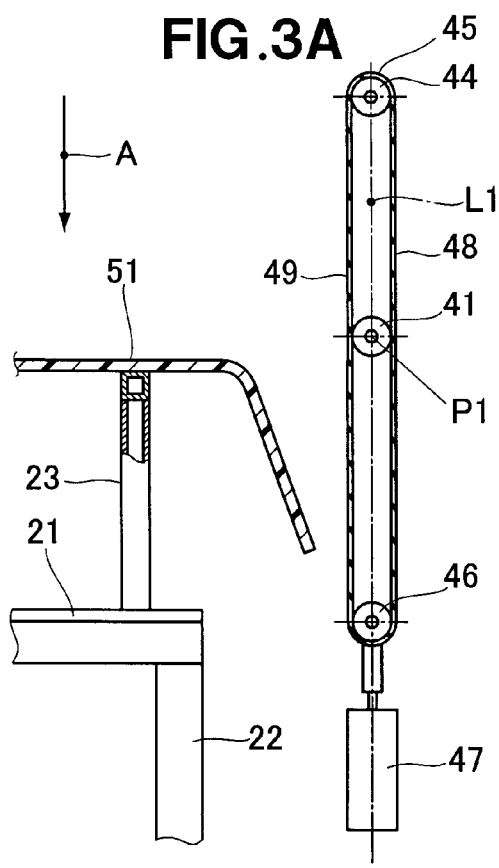
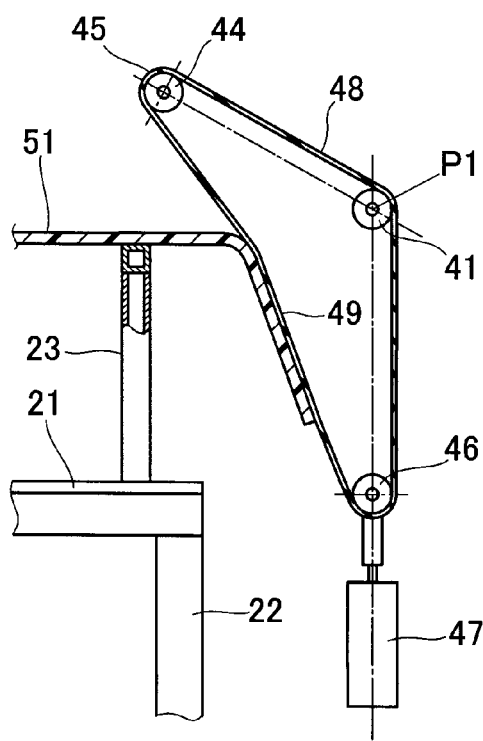

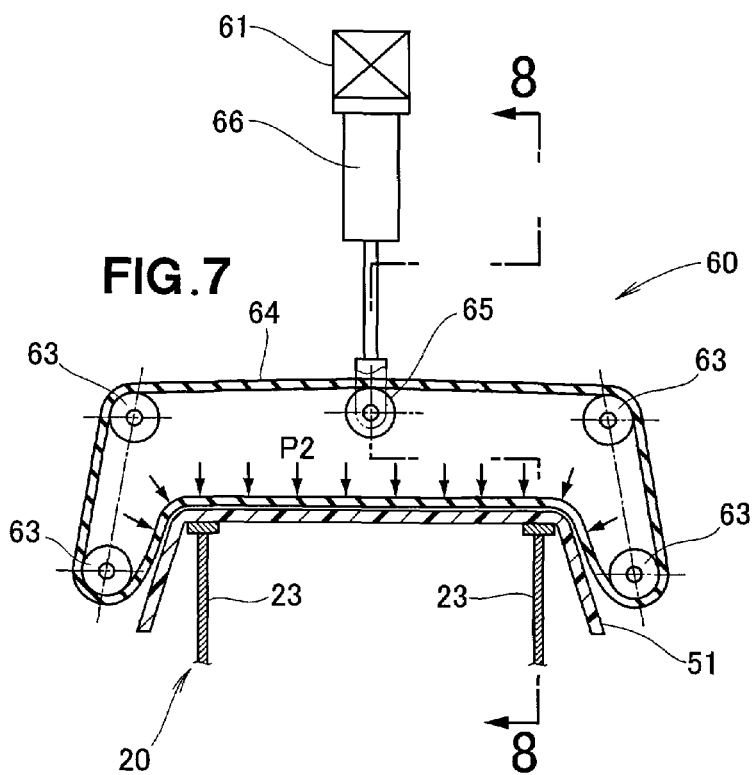
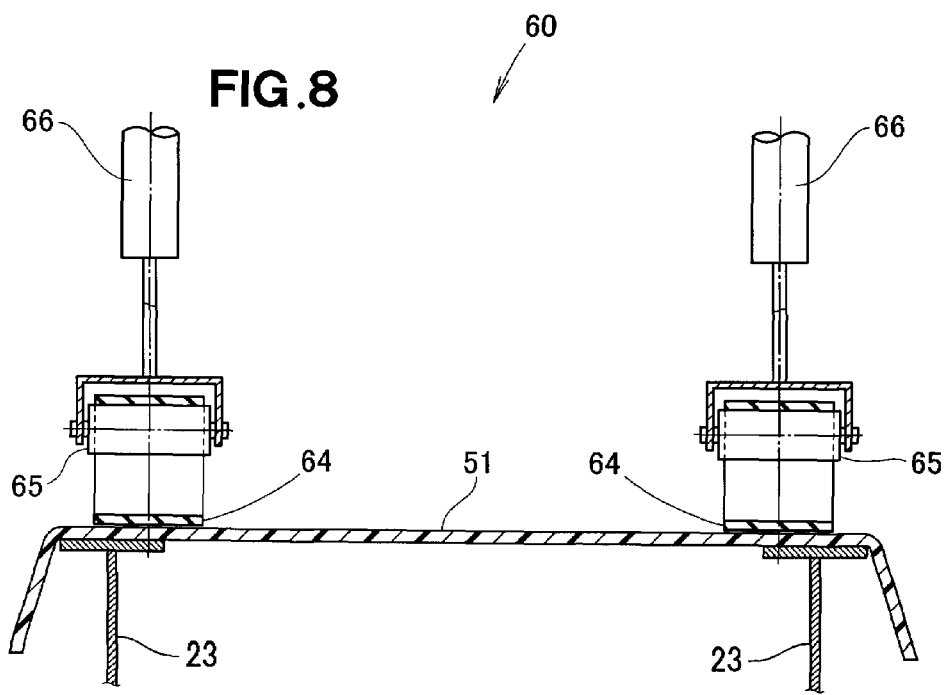

WORKPIECE CLAMP DEVICE AND METHOD

As authorized by 35 U.S.C. § 119, this application claims priority to and hereby incorporates by reference Japanese Patent Application No. 2005-237125, filed on Aug. 18, 2005.

FIELD OF THE INVENTION

The present invention relates to a workpiece clamp device and method for clamping a workpiece.

BACKGROUND OF THE INVENTION

When a large molded article is injection molded, an excess part referred to as a gate is attached to the molded article. This gate is cut off with a cutter. When the gate is cut out, the molded resin article must be held down (clamped), which requires a workpiece clamp device. An example of a workpiece clamp device used in the cutting of the gate is disclosed in Japanese Patent Laid-Open Publication No. 7-276362. A workpiece clamp device used in the cutting of the gate is described hereinbelow with reference to FIG. 9 hereof.

As shown in FIG. 9, a cradle 101 of a workpiece clamp device 100 is provided with a pair of supporting plates 102, 102. A resin bumper 103 is then placed on the supporting plates 102, 102, and the resin bumper 103 is clamped by being pressed on by a pair of rods 104, 104 from above. Next, a robot arm 106 provided with a cutter 105 is brought near the resin bumper 103, and a burr 107 and gate 108, which are excess parts, are cut off by the cutter 105.

When cutting is performed with the cutter 105, the resin bumper 103 must be firmly pressed down by the rods 104, 104 so that the resin bumper 103 does not move. However, pressure marks form in the resin bumper 103 because resins are generally softer than metals. These pressure marks reduce the marketability of the resin bumper 103.

In view of this, demand has arisen for a workpiece clamp device that does not cause pressure marks.

SUMMARY OF THE INVENTION

According to the first aspect of the present invention, there is provided a workpiece clamp device for clamping a workpiece, which comprises a workpiece cradle for placing the workpiece in a horizontal position; first free rotating rollers that are rotatably supported by supporting members at positions separated from the ends of the workpiece cradle; levers that are supported by the supporting members so as to be free to swing vertically about the rotational centers of the first free rotating rollers; actuators that are provided to the supporting members in order to swing the levers from their raised positions to positions where the levers hang over the workpiece cradle; second free rotating rollers that are rotatably supported at the distal ends of the levers; endless belts wound around the first free rotating rollers and the second free rotating rollers; and third free rotating rollers disposed inside the loops of the endless belts in order to pull down the lowermost ends of the endless belts that are wound around the first free rotating rollers and the second free rotating rollers.

The workpiece is held down by the endless belts, and since the endless belts have large surface areas, the holding force is uniform and the pressure per unit surface area is low. As a result, the occurrence of pressure marks on the workpiece can be prevented.

In addition, the action of the actuators raises the levers and moves the second free rotating rollers upward. As a result, the area above the workpiece is kept clear, and the workpiece can be taken up off the workpiece cradle. Specifically, it is easy to mount and remove the workpiece from the cradle, and operating efficiency can be improved.

It is preferable that the workpiece be a resinous bumper, and that the endless belts be soft belts. Although the resinous bumpers are soft, if soft belts are used, then the occurrence of pressure marks can be efficiently prevented.

According to a second aspect of the present invention, a workpiece clamp device for clamping a workpiece is provided, and this workpiece clamp device comprises a workpiece cradle for placing the workpiece in a horizontal position; first free rotating rollers that are rotatably supported by supporting members at positions separated from the ends of the workpiece cradle; levers that are supported by the supporting members so as to be free to swing vertically about the rotational centers of the first free rotating rollers; actuators that are extended between the supporting members and the levers in order to swing the levers from their raised positions to positions where the levers hang over the workpiece cradle; second free rotating rollers that are rotatably supported at the distal ends of the levers; endless belts wound around the first free rotating rollers and the second free rotating rollers; third free rotating rollers disposed inside the loops of the endless belts at the lowermost positions of the endless belts that are wound around the first free rotating rollers and the second free rotating rollers; and air cylinder units that are extended between the supporting members and the third free rotating rollers in order to pull down the third free rotating rollers.

The workpiece is held down by the endless belts, and since the endless belts have large surface areas, the holding force is uniform and the pressure per unit surface area is low. As a result, the occurrence of pressure marks on the workpiece can be prevented.

In addition, the action of the actuators raises the levers and moves the second free rotating rollers upward. As a result, the area above the workpiece is kept clear, and the workpiece can be taken up off the workpiece cradle. Specifically, it is easy to mount and remove the workpiece from the cradle, and operating efficiency can be improved.

It is preferable that the workpiece be a resinous bumper, and that the endless belts be soft belts. Although the resinous bumpers are soft, the occurrence of pressure marks can be effectively prevented if soft belts are used.

Furthermore, firmly pulling the third free rotating rollers by the air cylinder units increases the tension of the endless belts increases and the force for holding down the workpiece also. Specifically, the force holding down the workpiece can be freely adjusted by the operation of the air cylinder units.

According to a third aspect of the present invention, a workpiece clamp device for clamping a workpiece is provided, and this workpiece clamp device comprises a workpiece cradle for placing the workpiece in a horizontal position; a frame that serves to mount a robot arm and that has larger dimensions than the longitudinal dimensions of the workpiece; a plurality of free rotating rollers that are rotatably supported at the ends of the frame; an endless belt that is wound around the free rotating rollers; a tension roller that is disposed inside the loop of the endless belt; and an air cylinder that is extended between the robot arm, one part of the frame, and the tension roller in order to move the tension roller in a direction in which tension is applied to the endless belt.

The workpiece is held down by the endless belt, and since the endless belt has a large surface area, the holding force is uniform and the pressure per unit surface area is low. As a result, the occurrence of pressure marks on the workpiece can be prevented.

Furthermore, if the tension roller is firmly pulled by the air cylinder unit, then the tension in the endless belt can be increased and the holding force on the workpiece can be increased. Specifically the holding force on the workpiece can be freely adjusted by the operation of the air cylinder unit.

It is preferable that the workpiece be a resinous bumper, and that the endless belts be soft belts. Although the resinous bumpers are soft, the occurrence of pressure marks can be effectively prevented if soft belts are used.

According to a fourth aspect of the present invention, a method for clamping a workpiece is provided, and this workpiece clamping method comprises placing the workpiece on a workpiece cradle, and holding down the workpiece placed on the workpiece cradle with an endless belt.

Since the belt has a large surface area, the pressure per unit surface area applied to the workpiece is low. As a result, the occurrence of pressure marks on the workpiece can be prevented.

BRIEF DESCRIPTION OF THE DRAWINGS

Certain preferred embodiments of the present invention will be described in detail below, by way of example only, with reference to the accompanying drawings, in which:

FIGS. 3A through 3C are explanatory diagrams of the operation of the workpiece clamp device according to the present invention;

FIG. 7 is an explanatory diagram of the operation in FIG. 6;

FIG. 8 is a cross-sectional view along the line 8-8 in FIG. 7; and

DETAILED DESCRIPTION OF THE EXEMPLARY EMBODIMENT(S)

Figure 1:
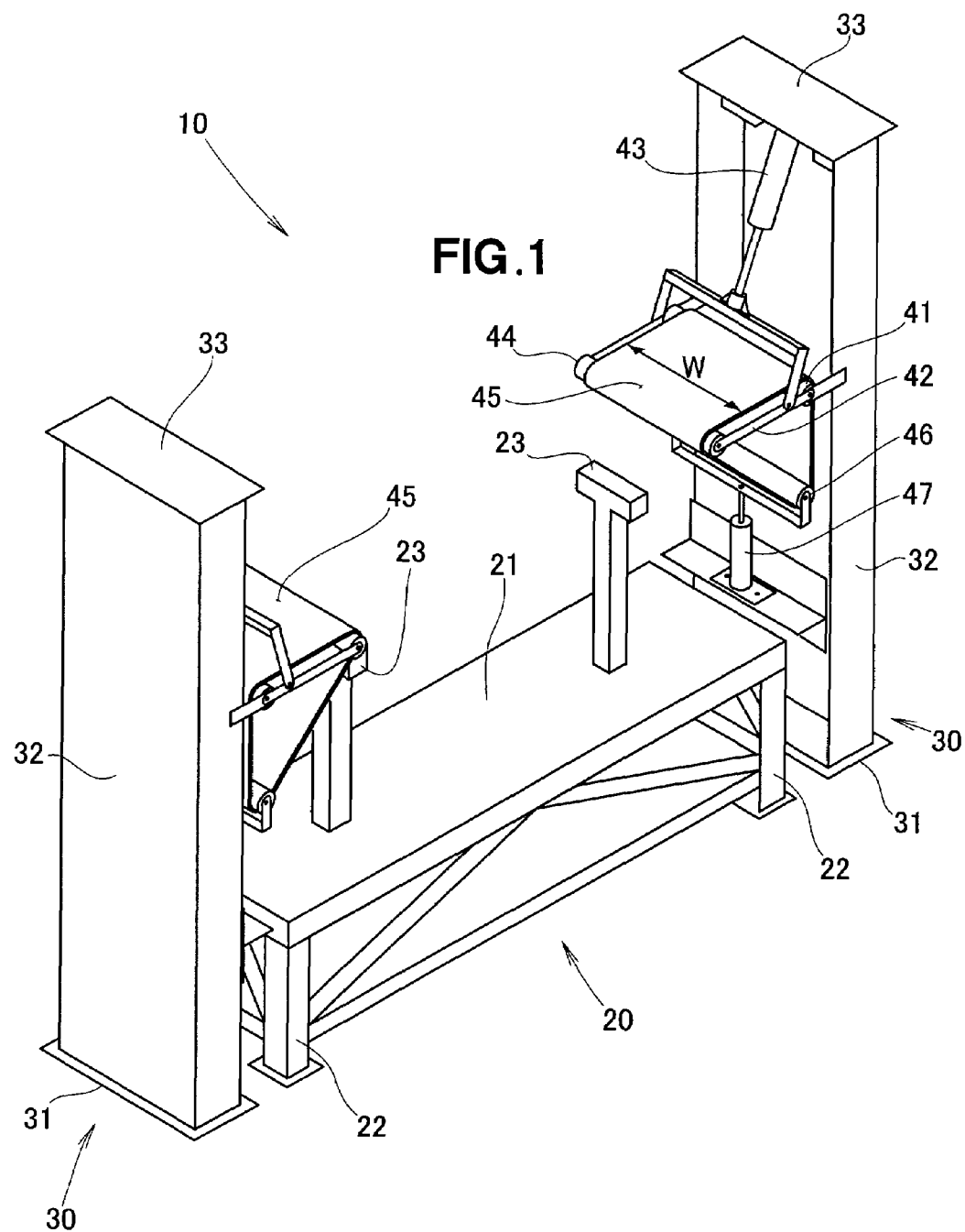
FIG. 1 is a perspective view of the workpiece clamp device according to the present invention.

As shown in FIG. 1, a workpiece clamp device 10 is composed of a workpiece cradle 20, first free rotating rollers 41 that are rotatably supported by supporting members 30 at positions separated from the ends of the workpiece cradle 20, levers 42 that are supported by the supporting members 30 so as to be free to swing vertically about the rotational centers of the first free rotating rollers 41, actuators 43 that are provided to the supporting members 30 in order to swing the levers 42 from their raised positions to positions where the levers hang over the workpiece cradle 20, second free rotating rollers 44 that are rotatably supported at the distal ends of the levers 42, endless belts 45 wound around the first free rotating rollers 41 and the second free rotating rollers 44, third free rotating rollers 46 that are disposed inside the loops of the endless belts 45 in order to pull down the lowermost ends of the endless belts 45 that are wound around the first free rotating rollers 41 and the second free rotating rollers 44, and air cylinder units 47 that extend between the supporting members 30 and the third free rotating rollers 46 in order to pull down the third free rotating rollers 46. The widths W of the endless belts 45 are determined according to the width of the workpiece 51 (FIG. 3A).

It is preferable that the workpiece cradle 20 be configured from a base plate 21, legs 22 that extend downward from the four corners of the base plate 21, and bearing pieces 23, 23 that extend upward from the base plate 21.

The supporting members 30 are preferably configured from base plates 31, columns 32 that are erected on these base plates 31, and top plates 33 that are provided at the top ends of the columns 32.

Figure 2:
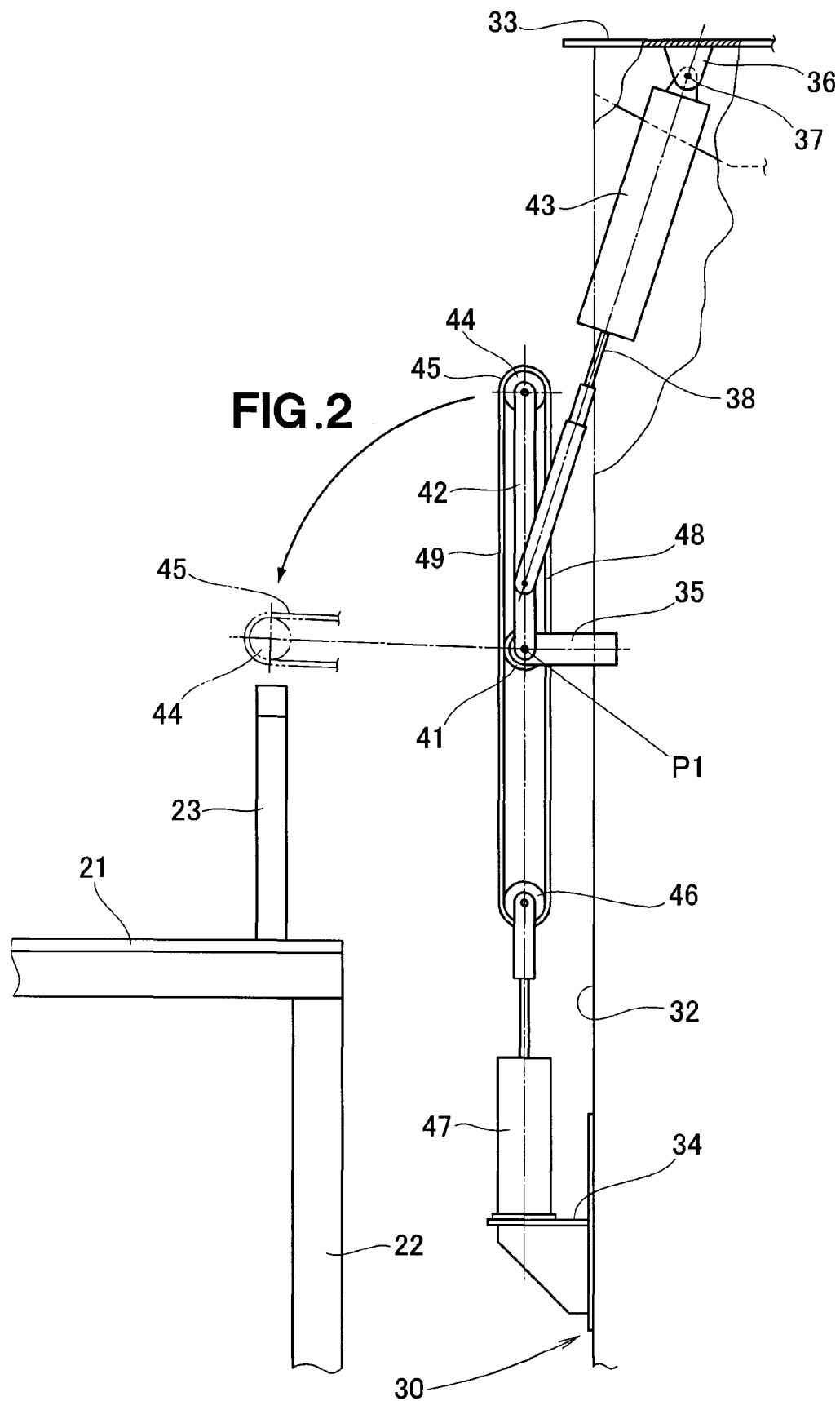
FIG. 2 is an enlarged partial view of the workpiece clamp device according to the present invention.

As shown in FIG. 2, the columns 32 of the supporting members 30 are provided with brackets 34 that support the lower ends of the air cylinder units 47, and brackets 35 that rotatably support the third free rotating rollers 46 and swingably support the levers 42. Also, the actuators 43 are suspended from the top plates 33 by means of crevices 36 and pins 37 to be capable of oscillating to the left and right in the diagram. Piston rods 38 of these actuators 43 are linked to the middles of the levers 42. When the actuators 43 are operated to move the piston rods 38 forward, the second free rotating rollers 44 can be brought near the bearing pieces 23, as shown by the transparent lines. When the actuators 43 are operated to move the piston rods 38 back, the levers 42 can be raised as shown by the solid lines. The endless belts 45 can be sectioned into column-side belt portions 48 that are near the columns 32, and workpiece-side belt portions 49 that are near the bearing pieces 23.

The operation of the workpiece clamp device described above will now be described.

The second free rotating rollers 44 are located directly above the first free rotating rollers 41, as shown in FIG. 3A. Specifically, the first free rotating rollers 41, the second free rotating rollers 44, and the third free rotating rollers 46 are aligned along a vertical line L1 that passes through P1, which corresponds to the rotational center of the first free rotating rollers 41 and which is the oscillation center of the second free rotating rollers 44. This condition is referred to as "the standby state." In this standby state, the workpiece 51 can easily be placed on the bearing pieces 23 as shown by the arrow A, because the second free rotating rollers 44 are distanced farthest from the bearing pieces 23.

Figure 3C:
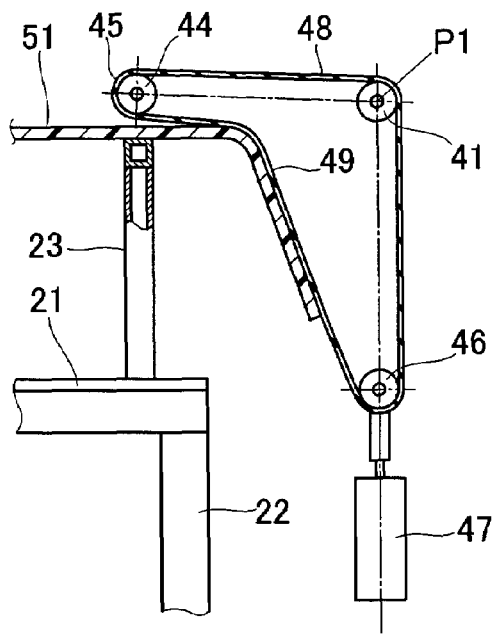

Next, the second free rotating rollers 44 are swung counterclockwise in the diagram around the oscillation center P1. The column-side belt portions 48 of the endless belts 45 remain in contact with the first free rotating rollers 41, but the workpiece-side belt portions 49 separate from the first free rotating rollers 41. At this point, parts of the workpiece-side belt portions 49 cover parts of the workpiece 51, as shown in FIG. 3B. Then, the second free rotating rollers 44 are swung further in the counterclockwise direction in the diagram around the oscillation center P1. At this point, large parts of the workpiece-side belt portions 49 cover the workpiece 51, as shown in FIG. 3C. The workpiece-side belt portions 49 push the workpiece 51 against the bearing pieces 23 with a force proportionate to their tension. The clamp over the workpiece 51 is thereby completed. The tension of the workpiece-side belt portions 49 can be increased or reduced by the operation of the air cylinder units 47.

Figure 4:
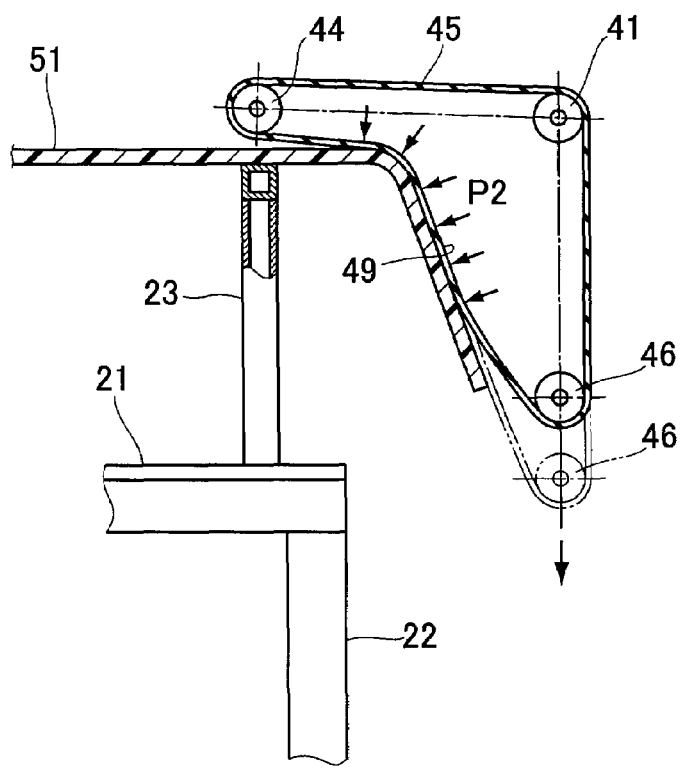
FIG. 4 is an explanatory diagram of the operation of the endless belts.

Specifically, the tension of the workpiece-side belt portions 49 can be increased by moving the third free rotating rollers 46 downward to the position indicated by the transparent lines, as shown in FIG. 4. At this time, the tension-based pressure P2 is a distributed load. Since it is a distributed load, there is no need for concern that pressure marks will form in the workpiece 51. Since there is no concern over pressure marks, the third free rotating rollers 46 can be lowered sufficiently to increase the pressure P2. The workpiece 51 can be firmly clamped down by increasing the pressure P2.

Figure 5:
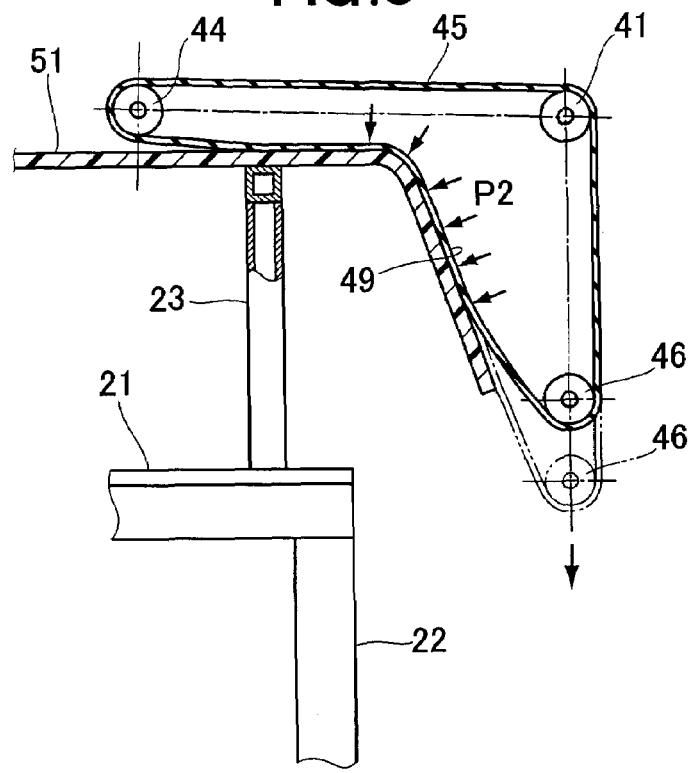
FIG. 5 is diagram of another embodiment of an endless belt.

Since numerical values obtained by dividing the pressure P2 by the surface areas of the workpiece-side belt portions 49 represent a distributed load, reducing the distributed load by increasing the surface areas of the workpiece-side belt portions 49 is effective in terms of preventing pressure marks. In view of this, the second free rotating rollers 44 are positioned even farther away from the first free rotating rollers 41, as shown in FIG. 5. As a result, the surface areas of the workpiece-side belt portions 49 can be increased to reduce the distributed load.

In cases in which the workpiece 51 is a resinous bumper, it is preferable that the endless belts 45 be soft belts made of felt or the like. This is because a resinous bumper is soft, but the occurrence of pressure marks can be efficiently prevented if soft belts are used.

Figure 6:
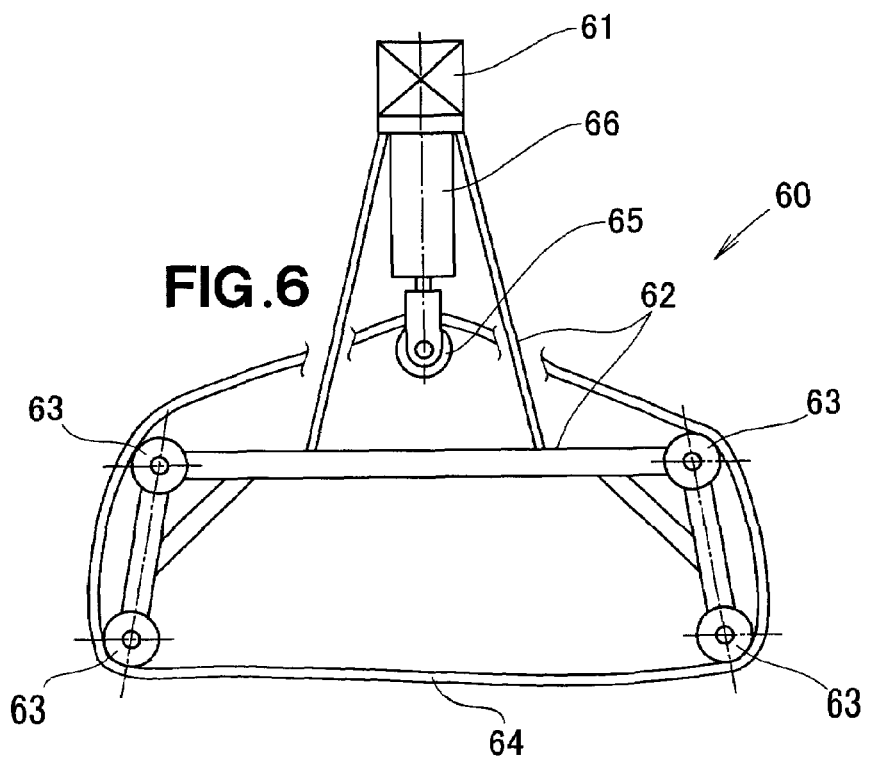
FIG. 6 is a diagram showing another embodiment of a workpiece clamp device according to the present invention.
Figure 9:
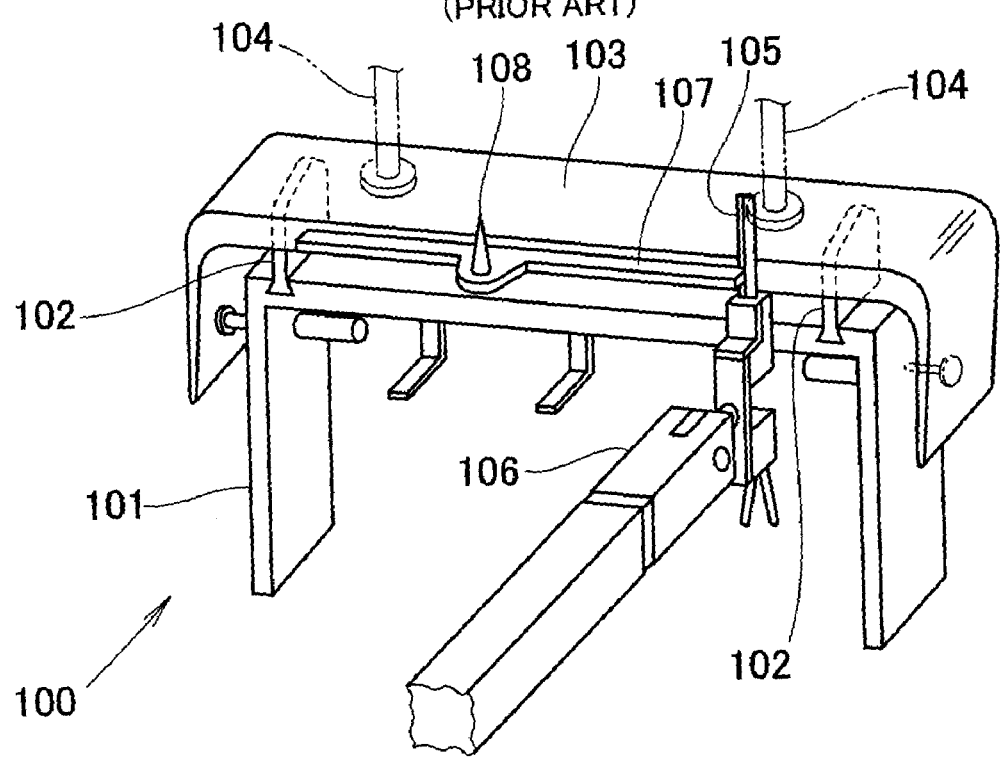
FIG. 9 is an explanatory diagram of a conventional workpiece clamp device.

Next, another embodiment of a workpiece clamp device will be described with reference to FIGS. 6 through 8.

A workpiece clamp device 60 is composed of bearing pieces 23, 23 (FIG. 7) on a workpiece cradle 20 for placing a workpiece 51 in a horizontal position, a frame 62 (FIG. 6) that serves to mount a robot arm 61 and that has larger dimensions than the longitudinal dimensions of the workpiece 51, free rotating rollers 63 that are rotatably supported at the ends of the frame 62, an endless belt 64 that is wound around the free rotating rollers 63, a tension roller 65 that is disposed inside the loop of the endless belt 64, and an air cylinder 66 that is extended between the robot arm 61, one part of the frame 62, and the tension roller 65 in order to move the tension roller 65 in a direction in which tension is applied to the endless belt 64.

In FIG. 7, operating the air cylinder 66 to pull up the tension roller 65 increases the tension in the endless belt 64 and enhances the pressure P2. As a result, the workpiece 51 can be pressed against the bearing pieces 23, 23. If the pulling force of the air cylinder 66 is increased, then the pressure P2 can be increased. Specifically, the extent of the pressure P2 can be adjusted with the air cylinder 66.

An endless belt 64 is disposed near each of the bearing pieces 23, 23 for a total of two belts, as shown in FIG. 8. The workpiece 51 extending to the left and right in FIG. 8 can be efficiently clamped down by the pair of endless belts 64, 64. Another possibility, depending on the type of the workpiece 51, is to hold down the center of the workpiece 51 with only one endless belt 64.

Instead of a resinous bumper, the workpiece 51 may also be a long, thin article made of rubber or glass.

Obviously, various minor changes and modifications of the present invention are possible in light of the above teaching. It is therefore to be understood that within the scope of the appended claims the invention may be practiced otherwise than as specifically described.

What is claimed is:

1. A workpiece clamp device for clamping a workpiece, comprising:
   a workpiece cradle for placing the workpiece in a horizontal position, the workpiece cradle having ends;
   first free rotating rollers rotatably supported by supporting members at positions separated from the ends of the workpiece cradle;
   levers supported by the supporting members vertically swingably about rotational centers of the first free rotating rollers, the levers having distal ends;
   actuators provided to the supporting members in order to swing the levers from raised positions thereof to positions where the levers hang over the workpiece cradle;
   second free rotating rollers rotatably supported at the distal ends of the levers;
   endless belts wound around the first free rotating rollers and the second free rotating rollers, the endless belts having lowermost ends; and
   third free rotating rollers disposed inside loops of the endless belts in order to pull down the lowermost ends of the endless belts wound around the first free rotating rollers and the second free rotating rollers.

2. The workpiece clamp device of claim 1, wherein the workpiece is a resinous bumper; and the endless belts are soft belts.

3. A workpiece clamp device for clamping a workpiece, comprising:
   a workpiece cradle for placing the workpiece in a horizontal position, the workpiece cradle having ends;
   first free rotating rollers rotatably supported by supporting members at positions separated from the ends of the workpiece cradle;
   levers supported by the supporting members vertically swingably about rotational centers of the first free rotating rollers;
   actuators extended between the supporting members and the levers in order to swing the levers from raised positions thereof to positions where the levers hang over the workpiece cradle;
   second free rotating rollers rotatably supported at distal ends of the levers;
   endless belts wound around the first free rotating rollers and the second free rotating rollers;
   third free rotating rollers disposed inside loops of the endless belts at lowermost positions of the endless belts wound around the first free rotating rollers and the second free rotating rollers; and
   air cylinder units extended between the supporting members and the third free rotating rollers in order to pull down the third free rotating rollers.

4. A workpiece clamp device for clamping a workpiece, comprising:
   a workpiece cradle for placing the workpiece in a horizontal position;
   a frame for mounting a robot arm and having larger dimensions than longitudinal dimensions of the workpiece;
   a plurality of free rotating rollers rotatably supported at ends of the frame;
   an endless belt wound around the free rotating rollers;
   a tension roller disposed inside a loop of the endless belt; and
   an air cylinder extended between the robot arm, one part of the frame, and the tension roller in order to move the tension roller in a direction in which tension is applied to the endless belt.

5. The workpiece clamp device of claim 4, wherein the workpiece is a resinous bumper; and the endless belts are soft belts.

* * * * *